United States Patent Office 3,446,751
Patented May 27, 1969

3,446,751
HEMOLYZING COMPOSITION
Theodore E. Weichselbaum, St. Louis, Mo., assignor, by mesne assignments, to Brunswick Corporation, Chicago, Ill., a corporation of Delaware
No Drawing. Filed Nov. 29, 1965, Ser. No. 510,382
Int. Cl. C09k 3/00; G01n 33/16
U.S. Cl. 252—408
4 Claims

ABSTRACT OF THE DISCLOSURE

Saponin is stabilized in a solution by using dimethylsulfoxide.

---

This invention relates to hemolyzing compositions which can be used to rupture the red cells of blood, i.e. in vitro.

Whole blood samples, both animal and human, are subjected to analysis procedures, e.g. as an aid to diagnosis, in the medical arts. Some such procedures, for example procedures directed to blood cell count, involve the hemolysis of red blood cells. Commonly used for such hemolysis are the naturally occurring glucosides known as saponins which are obtained from such plants as soapwort, soapbark and sarsaparilla. The saponins are characterized by their properties of foaming in water solution and producing hemolysis when solutions are introduced into whole blood. The saponins, being glucosides, include a sugar portion and an aglucone. The aglucone is a triterpenoid or steroid known as sapogenin which is characterized by either the triterpenoid, usually pentacyclic, structure as in quillaic acid or by the steroid structure usually having a spiro acetal side chain as in diosgenin.

The sugar portion of the glucosides includes one or more sugars such as glucose, sucrose, xylose, a pentose or methyl pentose, or other sugars. On hydrolysis the saponins yield sapogenin and one or more such sugars.

The saponins have been used for many years in laboratory medicine in aqueous or alcoholic solutions for rapidly hemolyzing the red cells, i.e. the erythrocytes of whole blood. The saponins do not damage the white cells and do not combine with low molecular weight compounds present in solutions of whole blood or plasma. The saponins are usually used in solutions in water, glycerin, low concentration alcoholic-aqueous solutions, or the like. These solutions are stable for only a few hours since the saponins precipitate within a few hours from a filtered solution, after which the solutions are considered unsatisfactory for use in hemolyzing the red cells.

It is a general object of this invention to provide a new and useful saponin composition for hemolyzing red blood cells, which composition has extended shelf life and improved stability.

Another object of this invention is to provide a new and useful solution of saponins for use in laboratory medicine techniques.

Other objects of this invention will be apparent from the description given below.

It has now been discovered that dimethyl sulfoxide is an excellent solvent for saponins and that solutions of saponins in dimethyl sulfoxide are unusually stable. Thus, according to the present invention, a hemolyzing composition is provided which contains a saponin and an amount of dimethyl sulfoxide sufficient to solubilize the saponin.

The composition can be prepared directly in use concentration containing .01 to 5 weight percent and preferably 0.1 to 2 weight percent saponin in total solvent. The total solvent can contain solvents other than dimethyl sulfoxide while still maintaining improved stability characteristics in the compositions. For example, the solvent can contain either a minor or a major amount, e.g. about 25 volume percent, or much less, to 100 volume percent, dimethyl sulfoxide with a co-solvent such as water, glycerin, ethanol or other alcohol, alcohol-water mixtures, etc. The co-solvent is also a solvent for the saponin.

The following examples are given for the purpose of illustrating the invention and are not intended as limitations.

Example I 0.1 percent by weight saponin is added to and dissolves in dimethyl sulfoxide at room temperature.

Example II 1.0 percent by weight saponin is added to and dissolves in dimethyl sulfoxide at room temperature.

Example III 2.0 percent by weight saponin is added to and dissolves in dimethyl sulfoxide at room temperature.

Example IV 1.0 percent by weight saponin is added to and dissolves in a mixture of 25 percent of volume dimethyl sulfoxide and 75 percent by volume water.

Example V 1.0 percent by weight saponin is added to and dissolves in a mixture of 25 percent by volume dimethyl sulfoxide and 75 percent volume glycerin.

Example VI 1.0 percent by weight saponin is added to and dissolves in a mixture of 50 percent by volume dimethyl sulfoxide, 45 percent by volume water and 5 percent by volume ethanol.

Solutions of saponins prepared according to the above examples have remained shelf stable at room temperature for six months. Even after six-months storage the solution is still highly satisfactory for performing hemolysis of animal and human bloods for use in various blood counting devices such as the Coulter Counter, and for use with various stains on white blood cells and other laboratory uses.

Concentrates of the saponins in dimethyl sulfoxide can also be prepared and later diluted to use dilution as needed for use. Such concentrates can contain many times, e.g. 10 to 20 or more times, the desired amount of saponin for the use dilution, and the concentrate can be diluted with dimethyl sulfoxide, water, glycerin, alcohol, alcohol-water mixtures or other solvents prior to use, while still retaining stability even in the use dilution. The amount of dimethyl sulfoxide necessary to stabilize the compositions is not precisely known but can be determined by simple trial and error for any system employing a co-solvent with the dimethyl sulfoxide. Of course, where dimethyl sulfoxide is the only solvent, no determination of minimum levels is necessary since the compositions are stable. Where dimethyl sulfoxide constituted only 25% of the solvent, the compositions were stable, and there is no reason to believe that they would not be stable at much lower concentrations of dimethyl sulfoxide in the solvent, as long as there is an amount of dimethyl sulfoxide present which is sufficient to solubilize the saponin.

The foregoing detailed description is given for clearness of understanding only and no unnecessary limitations are to be understood therefrom, as some modifications will be obvious to those skilled in the art.

I claim:

1. A stable hemolyzing composition consisting essentially of a saponin and a solvent for the saponin comprising, as the stabilizer, an amount of dimethyl sulfoxide sufficient to dissolve the saponin, and to impart shelf stability at room temperature for six months, satisfactory for performing hemolysis of blood cells.

2. The compostion of claim 1 wherein said saponin is present in an amount of from about 0.1 to about 2 percent by weight based on the solvent.

3. The composition of claim 1 wherein the solvent is a mixture of dimethyl sulfoxide and a second soluble ingredient selected from the group consisting of water, glycerin, alcohol, and mixtures thereof, in which the saponin is also soluble.

4. The composition of claim 3 wherein said ingredient is present in the solvent in a major amount.

References Cited

UNITED STATES PATENTS 2,365,898  12/1944  Morris et al. _____ 196—13

OTHER REFERENCES

Kononenko et al.: Chem. and Eng. Data Ser. 1, No. 1; 87–92 (1956).
Kokko et al.: J.A.C.S. 83: 2909–2911, July 5, 1961.
O'Brien: J. Mol. Biol., 7; 107–110 (1963).
Djerassi et al.: Blood, 22; 703–717, December 1963.

LEWIS GOTTS, *Primary Examiner.*

S. K. ROSE, *Assistant Examiner.*

U.S. Cl. X.R.

23—230; 260—210.5; 424—3